(12) United States Patent
Bajaj et al.

(10) Patent No.: US 12,391,828 B2
(45) Date of Patent: Aug. 19, 2025

(54) POLYMER-CERAMIC COMPOSITE ARTICLES WITH LOW DISSIPATION FACTOR AND HIGH DIELECTRIC CONSTANT, AND CORE-SHELL PARTICLE POWDERS AND PROCESSES FOR MAKING SUCH ARTICLES

(71) Applicant: SHPP GLOBAL TECHNOLOGIES B.V., Bergen op Zoom (NL)

(72) Inventors: Devendra Narayandas Bajaj, Bergen op Zoom (NL); Christopher Anthony Grabowski, Bergen op Zoom (NL); Viswanathan Kalyanaraman, Bergen op Zoom (NL); Johannes De Brouwer, Bergen op Zoom (NL)

(73) Assignee: SHPP GLOBAL TECHNOLOGIES B.V. (NL)

( * ) Notice: Subject to any disclaimer, the term of this patent is extended or adjusted under 35 U.S.C. 154(b) by 29 days.

(21) Appl. No.: 17/347,678

(22) Filed: Jun. 15, 2021

(65) Prior Publication Data
US 2021/0388206 A1 Dec. 16, 2021

(30) Foreign Application Priority Data
Jun. 15, 2020 (EP) .................................... 20180089

(51) Int. Cl.
*C08L 79/08* (2006.01)
*C08K 3/22* (2006.01)

(52) U.S. Cl.
CPC ................ *C08L 79/08* (2013.01); *C08K 3/22* (2013.01); *C08K 2003/2241* (2013.01); *C08L 2207/53* (2013.01)

(58) Field of Classification Search
None
See application file for complete search history.

(56) References Cited

U.S. PATENT DOCUMENTS

| 3,257,357 A | 6/1966 | Stamatoff |
| 3,257,358 A | 6/1966 | Stamatoff |

(Continued)

FOREIGN PATENT DOCUMENTS

| CA | 2304361 | * 4/1999 |
| CN | 1564721 | 1/2005 |

(Continued)

OTHER PUBLICATIONS

English Translation of Song et al. WO 2015/167069 (Year: 2015).*

(Continued)

*Primary Examiner* — Ronak C Patel
(74) *Attorney, Agent, or Firm* — Norton Rose Fulbright US LLP

(57) ABSTRACT

Polymer-ceramic composite articles with relatively low dissipation factor (Df) and relatively high dielectric constant (Dk), as well as polymer-ceramic core-shell powders and pellets adapted for making such composite articles. The ceramic-polymer composites, in powder and/or pellet forms, comprise a plurality of core-shell particles, where: each of the core-shell particles comprises a core and a shell around the core; the core comprises a ceramic that is selected from the group of ceramics consisting of: $BaTiO_3$, $SrTiO_3$, $TiO_2$, $CaTiO_3$, $MgTiO_3$, and combinations of any two or more thereof; and the shell comprises a polymer selected from the group of polymers consisting of: polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PFA), fluorinated ethylene propylene (FEP), ethylene tetrafluoroethylene (ETFE), polyvinylidene fluoride (PVDF), and ethylene chlorotrifluoroethylene (ECTFE).

5 Claims, 7 Drawing Sheets

(56) References Cited

U.S. PATENT DOCUMENTS

| | | | |
|---|---|---|---|
| 3,306,874 | A | 2/1967 | Hay |
| 3,306,875 | A | 2/1967 | Hay |
| 3,914,266 | A | 10/1975 | Hay |
| 4,028,341 | A | 6/1977 | Hay |
| 4,065,519 | A | 12/1977 | Koch |
| 4,769,424 | A | 9/1988 | Takekoshi et al. |
| 4,806,297 | A | 2/1989 | Brown et al. |
| 4,806,602 | A | 2/1989 | White et al. |
| 4,935,472 | A | 6/1990 | Brown et al. |
| 5,089,566 | A | 2/1992 | Brown et al. |
| 5,110,855 | A | 5/1992 | Blatz |
| 5,739,193 | A | 4/1998 | Walpita et al. |
| 6,518,323 | B1 | 2/2003 | Scheying et al. |
| 7,595,367 | B2 | 9/2009 | Carillo et al. |
| 9,691,520 | B2 | 6/2017 | Kim et al. |
| 2002/0040085 | A1* | 4/2002 | Venigalla ............... H05K 1/162 524/433 |
| 2003/0092557 | A1 | 5/2003 | Aichele et al. |
| 2005/0167136 | A1 | 8/2005 | Centofante |
| 2008/0275162 | A1 | 11/2008 | Schwab et al. |
| 2010/0010141 | A1 | 1/2010 | Nakamura et al. |
| 2011/0104435 | A1 | 5/2011 | Wang |
| 2013/0011660 | A1* | 1/2013 | Diekmann ............... B22F 10/28 428/407 |
| 2013/0171416 | A1* | 7/2013 | Diekmann ............... C08K 9/08 428/407 |
| 2014/0126113 | A1 | 5/2014 | Ogiwara |
| 2014/0126130 | A1 | 5/2014 | Aurongzeb |
| 2015/0073101 | A1 | 3/2015 | Kim et al. |
| 2015/0283791 | A1 | 10/2015 | Yamashita et al. |
| 2016/0255929 | A1 | 9/2016 | Nazzaro et al. |
| 2017/0088471 | A1 | 3/2017 | Randall et al. |
| 2017/0120566 | A1 | 5/2017 | Aldousari et al. |
| 2018/0202076 | A1 | 7/2018 | Van Der Schaaf et al. |
| 2018/0346714 | A1 | 12/2018 | Bushelman et al. |
| 2019/0062219 | A1 | 2/2019 | Ketcham et al. |
| 2019/0168420 | A1 | 6/2019 | Reese et al. |
| 2019/0185382 | A1 | 6/2019 | Bolvari et al. |
| 2019/0352804 | A1 | 11/2019 | Kopping et al. |
| 2022/0289638 | A1 | 9/2022 | Kalyanaraman et al. |
| 2022/0289982 | A1 | 9/2022 | Kalyanaraman et al. |

FOREIGN PATENT DOCUMENTS

| | | |
|---|---|---|
| CN | 101054300 | 10/2007 |
| CN | 101328024 | 12/2008 |
| CN | 102325645 | 1/2012 |
| CN | 102548933 | 7/2012 |
| CN | 102863224 | 1/2013 |
| CN | 102275983 | 4/2013 |
| CN | 202956507 | 5/2013 |
| CN | 202977722 | 6/2013 |
| CN | 103755848 | 4/2014 |
| CN | 103764393 | 7/2014 |
| CN | 104057091 | 9/2014 |
| CN | 104057092 | 9/2014 |
| CN | 105381765 | 3/2016 |
| CN | 105482010 | 4/2016 |
| CN | 105940044 A | 9/2016 |
| CN | 106749790 | 5/2017 |
| CN | 107266082 | 10/2017 |
| CN | 107286596 | 10/2017 |
| CN | 108407164 | 8/2018 |
| CN | 109890876 | 6/2019 |
| CN | 105940044 B | 7/2019 |
| CN | 110140244 | 8/2019 |
| CN | 110268006 | 9/2019 |
| CN | 107673658 | 10/2019 |
| EP | 868732 | 10/1998 |
| EP | 2157121 | 2/2010 |
| EP | 3555350 | 10/2019 |
| JP | H 01126338 | 5/1989 |
| JP | H 03236930 A | 10/1991 |
| JP | H 03236931 A | 10/1991 |
| JP | 11345518 | 12/1999 |
| JP | 2010/028179 | 2/2010 |
| KR | 2010 0098248 | 9/2010 |
| KR | 101796281 | 11/2017 |
| KR | 20180127148 A | 11/2018 |
| WO | WO 1997/042639 | 11/1997 |
| WO | WO 2014/015674 | 1/2014 |
| WO | WO 2015/167069 | * 11/2015 |
| WO | WO 2017/012119 | 1/2017 |
| WO | WO 2017/039634 | 3/2017 |
| WO | WO 2017/088471 | 6/2017 |
| WO | WO 2017/149086 | 9/2017 |
| WO | WO 2018/039619 | 3/2018 |
| WO | WO 2018/039620 | 3/2018 |
| WO | WO 2018/039628 | 3/2018 |
| WO | WO 2018/039634 | 3/2018 |
| WO | WO 2018/112390 | 6/2018 |
| WO | WO 2018/129170 | 7/2018 |
| WO | WO 2018/140451 | 8/2018 |
| WO | WO 2019/025472 | 2/2019 |
| WO | WO 2019/027420 | 2/2019 |
| WO | WO 2019/183192 | 9/2019 |
| WO | WO 2019/193578 | 10/2019 |
| WO | WO 2021/059218 | 5/2021 |

OTHER PUBLICATIONS

"Powder injection moulding: Cost-effective solutions for metal or ceramic parts", *Arburg*, www.arburg.com, 2016.

Benhadjala W. et al., "Effect of processing factors on dielectric properties of BaTiO3/hyperbranched polyester core-shell nanoparticles," *2013 IEEE 63rd Electronic Components and Technology Conference*, 2013, pp. 1767-1772, doi: 10.1109/ECTC.2013.6575814.

Brandt, K. et al., "Novel ceramic-polymer composites synthesized by compaction of polymer-encapsulated $TiO_2$-nanoparticles", *Composites Science and Technology*, 72(1), 65-71, 2011.

Chiang, C. K. et al., "Polymer Composites with High Dielectric Constant", *Ferroelectrics*, 275(1), 1-9, 2002.

Edwards, J. "Apple Watch and the story of ceramics", *iMore*, Apr. 14, 2017. https://www.imore.com/new-star-constellation-ceramic-watches.

European Search Report and Written Opinion for Application No. 20157480.3, dated Oct. 21, 2020.

European Search Report and Written Opinion for Application No. 20168054.3, dated Sep. 24, 2020.

European Search Report and Written Opinion for Application No. 20157486.0, dated Dec. 10, 2020.

European Search Report and Written Opinion for Application No. 20157482.9, dated Sep. 28, 2020.

European Search Report and Written Opinion for Application No. 20180089.3, dated Nov. 26, 2020.

European Search Report and Written Opinion for Application No. 22154749.0, dated Jul. 22, 2022.

Guo, H. et al., Cold sintering process for 8 mol% Y2O3-stabilized ZrO2 ceramics, *Journal of the European Ceramic Society*, 37(5), 2303-2308, 2017.

Handge, U. et al., "Viscoelastic and dielectric properties of composites of poly(vinyl butyral) and alumina particles with a high filling degree", Polymer, 82, pp. 337-348, 2016.

He, G. et al., "Research Progress on Polymer-based Dielectric Composites", Materials Review, 23, 2011. (English Machine Translation Provided).

Hutchinson, J.W. et al., "Mechanisms of toughening in ceramics", Theoretical and Applied Mechanics, 139-144, 1989.

International Search Report and Written Opinion in Corresponding PCT Application No. PCT/IB2020/058974, mailed Feb. 9, 2021.

International Search Report and Written Opinion in Corresponding PCT Application No. PCT/IB2020/058975, mailed Apr. 30, 2021.

International Search Report and Written Opinion in Corresponding PCT Application No. PCT/IB2020/059515, mailed Jan. 20, 2021.

International Search Report and Written Opinion in Corresponding PCT Application No. PCT/IB2021/052756, mailed Jun. 14, 2021.

International Search Report and Written Opinion for PCT/IB2023/050920 mailed Apr. 3, 2023.

(56) References Cited

OTHER PUBLICATIONS

Liu, J. et al., "Learn Iron and Forestry Engineering", *Engineering Materials, University of Technology Press*, pp. 280-282, Nov. 2016.
Luo, Y. et al., "PTC Characteristics and Microstructures of a Polymer Based Conductive Composite Filled with Various Titanium Compounds" China Plastics, 5, 2004. (English Machine Translation Provided).
Parhizkar, M. et al., "Correlation between sintering pressure and electrical properties of hot-press sintered gallium arsenide-polyaniline-polyethylene composite varistors", *Material Science in Semiconductor Processing*, 17, 143-148, 2014.
Peng, H. et al., The dimensional effect of $MgTiO_3$ ceramic filler on the microwave dielectric properties of $PTFE/MgTiO_3$ composite with ultra-low dielectric loss. *J Mater Sci: Mater Electron* 30, 6680-6687 (2019). https://doi.org/10.1007/10854-019-00977-v.
Stinson, L., "Here's What You Need to Know About Ceramic, The Fancy Material in Apple's Fanciest Watch", *Wired*, Sep. 8, 2016. https://www.wired.com/2016/09/apples-new-high-end-watch-crazy-tough-ceramics-baby/.
Stunda-Zujeva, A. et al., "Controlling the morphology of ceramic and composite powders obtained via spray drying—A review", *Ceramics International*, 43(15), 11543-11551, 2017.
Tai, J. et al., "Synthesis of Ceramic Precursor Polyvinylsilazane-b-Polystyrene and Preparation of Ceramic Nanoparticles", Journal of Synthetic Crystals, 5, 2011. pp. 1266-1270.
Wolff et al., "Novel, highly-filled ceramic-polymer composites synthesized by a spouted bed spray granulation process", *Composites Science and Technology*, 90, 154-159, 2014.

\* cited by examiner

POLYMER-CERAMIC COMPOSITE ARTICLES WITH LOW DISSIPATION FACTOR AND HIGH DIELECTRIC CONSTANT, AND CORE-SHELL PARTICLE POWDERS AND PROCESSES FOR MAKING SUCH ARTICLES

CROSS-REFERENCE TO RELATED APPLICATIONS

This application claims priority to European Application No. 20180089.3, filed Jun. 15, 2020, the contents of which are incorporated into the present application by reference in its entirety.

FIELD OF INVENTION

This disclosure relates generally to ceramic-thermoplastic composites and more particularly, but not by way of limitation, to polymer-ceramic composite articles with relatively low dissipation factor (Df) and relatively high dielectric constant (Dk) at frequencies in the 1 GHz to 15 GHz range, as well as core-shell particle powders, pellets of such powders, and processes for making articles.

BACKGROUND

New 5G networks will operate in two different frequency bands: a lower frequency below 6 GHz (for long-distance links) and a higher millimeter wave 20-100 GHz region (for short-distance, fast communication in cities). Ideally, 5G networks will lead to higher data transfer rates, lower latency and increased connectivity. Creating devices that operate in the millimeter wave region presents a materials challenge. Ceramics are primed for high-frequency performance due to their unique dielectric properties, high dielectric constant, and low dielectric loss. However, ceramics are typically expensive to manufacture. While polymer-ceramic composites could theoretically offer acceptable dielectric properties at lower manufacturing cost, there are limited options available for producing such composites with acceptable mechanical and dielectric properties.

There are a limited number of ceramic-polymer composites with a high proportion of ceramic, and fewer still with a sufficiently low dissipation factor (Df) and a sufficiently high dielectric constant (Dk) to be acceptable for use in functional components of 5G systems.

Known ceramic-polymer composites typically contain significantly less than 50% by volume of ceramic, and significantly more than 50% by volume of polymer.

A first category of such ceramic-polymer composites relies on a thermoset approach in which a monomer is combined with the porous ceramic structure and cured to form a composite. But this approach generally requires undesirably-long curing times, and density of a final part is generally dependent on the size of pores in the ceramic and the viscosity of the resin.

A second category of such ceramic-polymer composites relies on thermoplastic polymers, which generally do not require time to cure and can instead be simply heated to melt and subsequently cooled to solidify the thermoplastic polymer, thereby enabling relatively faster processing. Ceramic fillers have been compounded with thermoplastics to achieve certain properties, including stiffness and strength. However, the ceramic filler content in such thermoplastic polymers is typically limited to significantly less than 50% by volume due to limitations of conventional compounding technology. For example, in a traditional approach of this type, a ceramic filler is added to a polymer and the mixture is compounded in an extruder and pelletized. Generally, the dispersion and distribution of the ceramic filler in the polymer matrix is highly dependent on the type of ceramic and polymer, other additives and coupling agents, rate of mixing, shear rate, temperature, and various other parameters. Due at least to these limitations, higher proportions of ceramics fillers (e.g., greater than 50% by volume) in a polymer matrix is challenging, and may for example damage the screws in an extruder (depending on the hardness of the ceramic) and degrade the polymer because of shear and heat.

A third category of such ceramic-polymer composites relies on the more-recently identified approach known as "cold sintering," various aspects of which may be described in U.S. Patent App. Pub. No. US 2017/0088471 and PCT Application Pub. Nos. (1) WO 2018/039620, (2) No. WO 2018/039628, (3) WO 2018/039619, and (4) WO 2018/039634. One drawback with cold sintering, however, is that not all ceramics can be effectively cold sintered. For example, certain structural ceramics like Aluminum Oxide, Zirconia, Titanium Oxide, and Silicon Carbide generally cannot be cold sintered. Additionally, the structures produced by cold sintering typically utilize ceramic as the matrix and polymer as the filler, which generally results in differing structural properties and differing suitability for various end-use applications.

A fourth category of such ceramic-polymer composites can involve dissolving an amorphous polymer in a solvent, and mixing ceramic particles into the polymer-solvent mixture. For example, a sprouted-bed granulation process can be used to create polymer-coated ceramic powders, such as described in Wolff, Composites Science and Technology 90 (2014) 154-159.

SUMMARY

This disclosure includes polymer-ceramic composite parts with relatively low dissipation factor (Df) (e.g., less than 0.005, 0.003, or 0.0005) and relatively high dielectric constant (Dk) (e.g., greater than 4.5, 10, 15, or 20), for example, at a frequency of 5 GHz. Such parts are useful in a variety of applications, including components for use in 5G telecommunications systems, such as antennas, wave guides, RF bandpass filters, and RF couplers.

This disclosure also includes core-shell particles, powders and pellets of such core-shell particles, methods of making such core-shell particles in powder and pellet forms, and methods of molding a part from a powder of such core-shell particles. Such core-shell particles comprise a core and a shell around the core, in which the core comprises a ceramic selected from the group of ceramics consisting of: $BaTiO_3$, $SrTiO_3$, $TiO_2$, $CaTiO_3$, $MgTiO_3$, and combinations of any two or more thereof; and the shell comprises a polymer selected from the group of polymers consisting of: polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PFA), fluorinated ethylene propylene (FEP), ethylene tetrafluoroethylene (ETFE), polyvinylidene fluoride (PVDF), and ethylene chlorotrifluoroethylene (ECTFE). Such core-shell particles, and powders and pellets thereof, permit the molding of ceramic-composite molded parts with high ceramic content, and relatively low dissipation factor (Df) and relatively high dielectric constant (Dk) by conventional processes such as compression molding and injection molding.

The present methods of making polymer-ceramic core-shell particles permit the formation of such core-shell particles with relatively uniform coatings of the polymer shell material. More particularly, in the present core-shell particles (formed by the present methods), the shell can surround substantially all of the surface of the core, at least in configurations in which the polymer comprises at least 10% by volume of the core-shell particles. Likewise, the present core-shell particles (formed by the present methods) facilitate the molding of ceramic-polymer composite parts with significantly less agglomeration of ceramic particles than prior compounding methods in which parts are molded from a mixture of separate ceramic particles and polymer particles. By way of example, and not to be limited by a particular theory, it is currently believed that the substantially uniform polymer coating formed on the ceramic core causes the polymer to resist separation from the ceramic during processing and molding, and thereby resist contact between (and agglomeration of) the ceramic cores. Further, the present methods of making polymer-ceramic core-shell particles permit the formation of relatively fine, relatively consistent powders without the need for grinding or sieving. The present methods can also result in core-shell particles with less variation in size relative to the starting polymer powder which, in turn, leads to more uniform distribution of ceramic and polymer in molded part than has been possible with traditional compounding methods in which parts are molded from a mixture of separate ceramic particles and polymer particles.

Ultimately, the present methods permit the formation of powders of polymer-ceramic core-shell particles with relatively large fractions of ceramic (e.g., greater than 50% by volume, between 50% and 90% by volume, between 50% and 70% by volume, and/or the like). By way of further example, for ceramic:polymer ratios between 55:45 and 65:45 by volume, the ceramic particles can have a surface area of from 2 to 4 $m^2/g$ (e.g., from 2 to 2.5 $m^2/g$, 2 to 3 $m^2/g$, 2 to 3.5 $m^2/g$, 2.5 to 3 $m^2/g$, 2.5 to 3.5 $m^2/g$, 2.5 to 4 $m^2/g$, 3 to 3.5 $m^2/g$, 3 to 4 $m^2/g$, or 3.5 to 4 $m^2/g$); for ceramic:polymer ratios between 50:50 and 60:40 by volume, the ceramic particles can have a surface area of from 3 to 6 $m^2/g$ (e.g., from 3 to 3.5 $m^2/g$, 3 to 4 $m^2/g$, 3 to 4.5 $m^2/g$, 3 to 4 $m^2/g$, 3 to 5 $m^2/g$, 3 to 4 $m^2/g$, 3 to 5.5 $m^2/g$, 3.5 to 4 $m^2/g$, 3.5 to 4.5 $m^2/g$, 3.5 to 5 $m^2/g$, 3.5 to 5.5 $m^2/g$, 4 to 4.5 $m^2/g$, 4 to 5 $m^2/g$, 4 to 5.5 $m^2/g$, 4.5 to 5 $m^2/g$, 4.5 to 5.5 $m^2/g$, or 5 to 5.5 $m^2/g$); for ceramic:polymer ratios between 60:40 and 70:30 by volume, the ceramic particles can have a surface area of from 1 to 3 $m^2/g$ (e.g., from 1 to 1.5 $m^2/g$, 1 to 2 $m^2/g$, 1 to 2.5 $m^2/g$, 1.5 to 2 $m^2/g$, 1.5 to 2.5 $m^2/g$, 1.5 to 3 $m^2/g$, 2 to 2.5 $m^2/g$, 2 to 3 $m^2/g$, or 2.5 to 3 $m^2/g$); and for ceramic:polymer ratios between 70:30 and 90:10 by volume, the ceramic particles can have a surface area of from 0.5 to 2 $m^2/g$ (e.g., from 0.5 to 1 $m^2/g$, 0.5 to 1.5 $m^2/g$, 0.5 to 2 $m^2/g$, 1 to 1.5 $m^2/g$, 1 to 2 $m^2/g$, or 1.5 to 2 $m^2/g$).

By way of example, such polymer-ceramic core-shell particles with higher proportions of structural ceramic (e.g., $Al_2O_3$) can be beneficial in structural components like gears, CE housings, protective shields, and the like because these types of applications typically benefit from properties such as wear resistance, hardness, scratch resistance, toughness, and stiffness. Additionally, the inclusion of ceramic particles in a polymer matrix can permit the adjustment and/or selection of properties like dielectric constant, dissipation factor, and RF transparency that can be beneficial for certain electronics applications.

In certain configurations of the present dense polymer-ceramic composite articles, the article comprises: a polymer matrix and ceramic filler dispersed in the polymer matrix; the ceramic filler comprises particles of a ceramic that is selected from the group of ceramics consisting of: $BaTiO_3$, $SrTiO_3$, $TiO_2$, $CaTiO_3$, $MgTiO_3$, and combinations of any two or more thereof; and the polymer matrix comprises a polymer selected from the group of polymers consisting of: polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PFA), fluorinated ethylene propylene (FEP), ethylene tetrafluoroethylene (ETFE), polyvinylidene fluoride (PVDF), and ethylene chlorotrifluoroethylene (ECTFE); where the ceramic filler comprise between 50% and 90% (e.g., between 50% and 80%, between 50% and 70%, or between 55% and 65%) by volume of the article, and the polymer matrix comprises between 10% and 50% (e.g., between 20% and 50%, between 30% and 50%, or between 35% and 45%) by volume of the article; and where, at a frequency of 5 GHz, the article has a loss tangent (Df) of less than 0.005 and a dielectric constant (Dk) of more than 4.5. In some such configurations, the Relative Density of the article is greater than 90%, and/or the ceramic particles have a Dv50 of from 50 nanometers to 100 micrometers, and/or the ceramic particles are substantially free of agglomeration, and/or substantially all of the polymer in the polymer matrix is not cross-linked. Some of the present articles comprise a portion of an antenna, a portion of a wave guide, a portion of an RF bandpass filter, or a portion of an RF coupler. In some configurations, at frequencies of 1 GHz to 10 GHz (or of 1 GHz to 15 GHz), the article has a loss tangent (Df) of less than 0.005 and a dielectric constant (Dk) of more than 4.5.

In certain configurations of the present ceramic-polymer composite powders, the powder comprises: a plurality of core-shell particles, where: each of the core-shell particles comprises a core and a shell around the core; the core comprises a particle of a ceramic that is selected from the group of ceramics consisting of: $BaTiO_3$, $SrTiO_3$, $TiO_2$, $CaTiO_3$, $MgTiO_3$, and combinations of any two or more thereof; and the shell comprises a polymer selected from the group of polymers consisting of: polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PFA), fluorinated ethylene propylene (FEP), ethylene tetrafluoroethylene (ETFE), polyvinylidene fluoride (PVDF), and ethylene chlorotrifluoroethylene (ECTFE); where the core-shell particles comprise between 50% and 90% by volume of ceramic, and between 10% and 50% by volume of the polymer; where the core-shell particles have a Dv50 of from 50 nanometers (nm) to 100 micrometers (μm); where substantially all of the polymer is not cross-linked; and where the core-shell particles are in powder form. In some configurations of the present powders, the core-shell particles comprise between 50% and 70% by volume of the ceramic. In some configurations of the present powders, the core-shell particles have a polymer-solvent (i.e., a solvent in which the polymer is soluble) content of less than 3000 parts per million (ppm).

In some configurations of the present ceramic-polymer composite materials in pellet form, the material comprises: a plurality of solid pellets each comprising a plurality of core-shell particles, where: each of the core-shell particles comprises a core and a shell around the core; the core comprises a particle of a ceramic that is selected from the group of ceramics consisting of: $BaTiO_3$, $SrTiO_3$, $TiO_2$, $CaTiO_3$, $MgTiO_3$, and combinations of any two or more thereof; and the shell comprises a polymer selected from the group of consisting of: polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PFA), fluorinated ethylene propylene (FEP), ethylene tetrafluoroethylene (ETFE), polyvinylidene fluoride (PVDF), and ethylene chlorotrifluoroethylene (ECTFE); the shells of adjacent core-shell particles are joined to resist separation of the adjacent core-shell particles and deformation of a respective pellet; the core-shell particles comprise between 50% and 90% by volume of ceramic, and between 10% and 50% by volume of the polymer; and substantially all of the polymer is not cross-linked.

In some implementations of the present methods of forming a ceramic-polymer composite powder, the method comprises: mixing a solvent, particles of a ceramic that is selected from the group of ceramics consisting of: $BaTiO_3$, $SrTiO_3$, $TiO_2$, $CaTiO_3$, $MgTiO_3$, and combinations of any two or more thereof, and a polymer selected from the group of polymers consisting of: polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PFA), fluorinated ethylene propylene (FEP), ethylene tetrafluoroethylene (ETFE), polyvinylidene fluoride (PVDF), and ethylene chlorotrifluoroethylene (ECTFE); dissolving at least partially the polymer in the solvent by superheating the mixture to a first temperature above the normal boiling point of the solvent and while maintaining the mixture at or above a first pressure at which the solvent remains substantially liquid; agitating the superheated mixture for a period of minutes while maintaining the mixture at or above the first temperature and at or above the first pressure; cooling the mixture to or below a second temperature below the boiling point of the solvent to cause the polymer to precipitate on the particles of the ceramic and thereby form a plurality of core-shell particles each comprising a core and a shell around the core, where the core comprises a particle of the ceramic and the shell comprises the polymer.

The terms "a" and "an" are defined as one or more unless this disclosure explicitly requires otherwise. The terms "substantially" and "about" are each defined as largely but not necessarily wholly what is specified (and includes what is specified; e.g., substantially 90 degrees includes 90 degrees), as understood by a person of ordinary skill in the art. In any disclosed embodiment, the term "substantially" or "about" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. The phrase "at least one of A and B" has the same meaning as "A, B, or A and B."

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

As used herein, a "size" or "diameter" of a particle refers to its equivalent diameter—referred to herein as its diameter—if the particle is modelled as a sphere. A sphere that models a particle can be, for example, a sphere that would have or produce a value measured for the particle, such as the particle's mass and/or volume, light scattered by the particle, or the like. Particles of the present dispersions can, but need not, be spherical.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Figure 1:
FIG. 1 is a schematic illustration of one of the present core-shell particles comprising a polymer shell and a ceramic particle core.

Referring now to the drawings, and more particularly to FIG. 1, a schematic illustration is shown of one of the present core-shell particles 10 comprising a core 14 and a shell 18 around the core. In the illustrated configurations, for example, core 14 comprises a single particle of a ceramic that is selected from the group of ceramics consisting of: Titania ($TiO_2$), Barium Titanate ($BaTiO_3$), Strontium Titanate ($SrTiO_3$), Calcium Titanate ($CaTiO_3$), Magnesium Titanate ($MgTiO_3$), and combinations of any two or more thereof; and may have a spherical, elongated (e.g., cylindrical), irregular, or otherwise fanciful shape as shown. In other configurations, the core may comprise an agglomeration of two or more particles, and/or may have a substantially spherical shape. $TiO_2$, $BaTiO_3$, $SrTiO_3$, and $CaTiO_3$ are ceramics that can be considered as high-k or high-Dk materials with permittivity values at or exceeding 100 for MHz and GHz frequencies. $MgTiO_3$ can be considered a mid-k or mid-Dk material with a permittivity value near 20 at MHz and GHz frequencies.

Shell 18 comprises a polymer selected from the group of polymers consisting of: polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PFA), fluorinated ethylene propylene (FEP), ethylene tetrafluoroethylene (ETFE), polyvinylidene fluoride (PVDF), and ethylene chlorotrifluoroethylene (ECTFE). In the illustrated configuration, shell 18 covers or surrounds substantially all of core 14. In other configurations, the shell need not cover or surround all of the core (e.g., may cover a majority of the core). As described in more detail below, the present methods permit the formation of a PPS shell (e.g., 18) that is not cross-linked.

For the present composites, powders, and pellets, increasing the volume percentage of ceramic will generally increase overall permittivity; however, this does not necessarily occur in a linear "rule of mixtures" fashion. For example, a volume fraction of greater than 40% of $TiO_2$ (Dk=100) is needed to generate a polymer-ceramic composite of Dk>10 for polymers with Dk=3. Certain ceramics are considered low-k materials. For example, Silica ($SiO_2$) and Alumina ($Al_2O_3$) have dielectric constant (Dk) values of 4 and 10, respectively. Both materials also exhibit exceptionally low dielectric loss (Df<0.0005). These factors can be critically important in the design of microwave circuit components where signal propagation speed (higher when reducing Dk) and signal attenuation (lower when reducing Df) are required at GHz frequency. In contrast, high-Dk materials are candidates for microwave applications that demand reduction in size/miniaturization. For example, antenna size is tuned to the wavelength of the incoming signal. Increasing the permittivity of the medium reduces the wavelength and thus a smaller antenna is needed. Low Df values are typically still desirable to limit signal losses. The present core-shell particles and pellets, methods, and resulting polymer-ceramic composites, permit volume fractions of ceramic that are sufficiently large (e.g., greater than 50% ceramic by volume) to obtain the desired Dk and low Df at lower manufacturing cost than ceramic alone.

In the present core-shell particles, the core (e.g., 14) can have a particle size (e.g., diameter or minimum transverse dimension) of from 50 nanometers (nm) to 100 micrometers (μm). For example, the cores in a ceramic powder used to form core-shell particles in the present methods can have a Dv90 or Dv50 of between 50 nm and 100 μm.

The present powders comprise a plurality of particles 10, for example in a powder form. For example, a powder may be characterized by a polymer-solvent (i.e., a solvent in which the polymer is soluble) content of less than 3,000 parts per million (ppm) (e.g., less than 2,000 ppm, less than 1,000 ppm). However, in some configurations, the powder may be mixed with and/or suspended in a liquid that is not a polymer-solvent (a liquid in which the polymer will not dissolve), such as water. In such configurations, the liquid may resist and/or prevent particles from becoming airborne or breathable, such as for transportation and handling of finer powders.

In some configurations of the present powders, the core-shell particles comprise between 40% and 90% by volume of the ceramic (e.g., 50% and 70% by volume of the ceramic).

Figure 2:
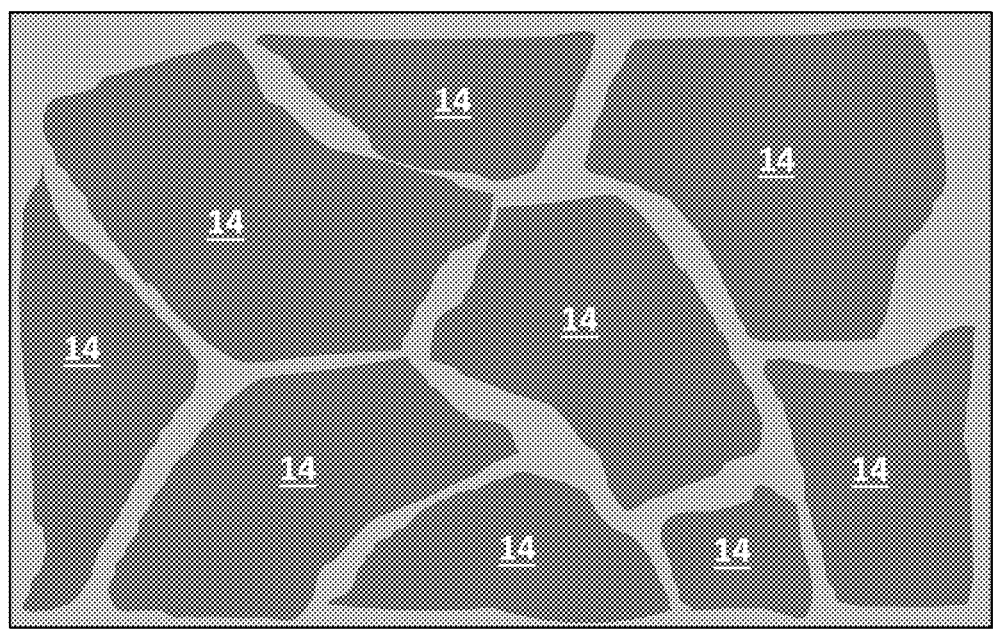
FIG. 2 is a schematic illustration of the internal structure of a part molded from a powder of the present core-shell particles.

FIG. 2 is a schematic illustration of the internal structure of a part molded from a dry powder of the present core-shell particles 10. As shown, the polymer shells 18 of adjacent particles merge together to fill interstices between and bond the particles together. As shown, the relatively higher proportion (e.g., 40% to 90% by volume) of ceramic in the powder means that a correspondingly higher proportion of the molded part is also ceramic. Further, the core-shell structure of the particles prior to molding results in more-uniform distribution of polymer within the matrix of the molded part. By way of example, the present core-shell particles, in which the ceramic particles are substantially free of agglomeration and/or substantially all of the ceramic particles are each substantially surrounded by polymer, enable the molding of parts that are also substantially free of agglomeration and/or in which substantially all of the ceramic particles is separated by a layer of polymer from adjacent ceramic polymer particles.

The present powders can also be pelletized or joined into a pellet form in which the shells of adjacent core-shell particles are joined to resist separation of the adjacent core-shell particles and deformation of a respective pellet. For example, the present powders may be subjected to elevated temperatures and pressures in an extruder. Such temperatures may be at or near the glass transition temperature ($T_g$) of the polymer in the core-shell particles to render the polymer tacky but not liquefied, and such pressures (e.g., during extrusion) may be elevated relative to ambient, such that shells of adjacent core-shell particles join sufficiently to resist separation but no so much that the independent boundaries/identities of adjacent shells are lost. In such configurations, the pellet form may facilitate transportation of the core-shell particles (e.g., for distribution). Such pelletization can be achieved by any of various methods and processes that are known in the art, such as, for example, via a screw extruder.

Polyetherimide (PEI) and Polyetherimide (PEI) Copolymers

Polyetherimide (PEI) is an amorphous, amber-to-transparent thermoplastic with characteristics similar in some respects to polyether ether ketone (PEEK). Relative to PEEK, PEI may be lower in impact strength and usable temperature. Examples of PEI are available from SABIC Innovative Plastics under the trade names ULTEM, SILTEM, and EXTEM.

The polyetherimide can be selected from polyetherimide homopolymers, e.g., polyetherimides, polyetherimide copolymers, e.g., polyetherimide sulfones, and combinations thereof. Polyetherimides include, but are not limited to, known polymers, such as those sold by SABIC Innovative Plastics under the ULTEM, EXTEM, and SILTEM brands (Trademarks of SABIC innovative Plastics IP B.V.). At 1 MHz, PEI has a dielectric constant (Dk) of 3.15 and a dissipation factor (Df) of 0.0013 at room temperature.

Polyphenylene Ether (PPE) Resins

Generally, polyphenylene ether (PPE) is known in the art as a high-temperature thermoplastic. PPE is typically not used in its pure form due to difficulties in processing, and is instead primarily used as blend with polystyrene, high impact styrene-butadiene copolymer, or polyamide. At 1 MHz, PPE has a dielectric constant (Dk) of 2.7 and a dissipation factor (Df) of 0.0007 at room temperature.

PPE includes unsubstituted polyphenylene ether polymers, substituted polyphenylene ether polymers wherein the aromatic ring is substituted, polyphenylene ether copolymers and blends thereof. Also included are polyphenylene ether polymers containing moieties prepared by grafting onto the polyphenylene ether in a known manner such materials as vinyl monomers or polymers such a polystyrenes and elastomers, as described in U.S. Pat. No. 5,089,566 issued to S. Bruce Brown. Coupled polyphenylene ether polymers in which coupling agents such as low molecular weight polycarbonates, quinones, heterocycles and formals undergo reaction in the known manner with the hydroxy groups of two phenyl ether chains to produce a high molecular weight polymer are also included.

Various types of PPE resins may be used in the present core-shell particles and in the present methods, and may be prepared by various methods known in the art, examples of which are described in U.S. Pat. No. 7,595,367 to SABIC Global Technologies BV. For example, various PPE resins are available from SABIC Innovative Plastics in designated grades of polyphenylene oxide (PPO), such as, for example, PPO Grade PP0640 having an intrinsic viscosity (IV) of 0.4 grams per cubic centimeter (g/cm$^3$), PPO Grade PP0630 having an IV of 0.33 g/cm$^3$, and PPO Grade PP0646 having an IV of 0.46 g/cm$^3$. The examples described below utilized a poly(2,6-dimethyl-1,4-phenylene ether) having an intrinsic viscosity of about 0.40 deciliter per gram (g/cm$^3$) in chloroform at 25° C., obtained as PP0640 from SABIC Innovative Plastics. PPO grades available from SABIC Innovative Plastics (e.g., PP0640) are bifunctional poly(arylene ether), the structure of which is given by Formula (3):

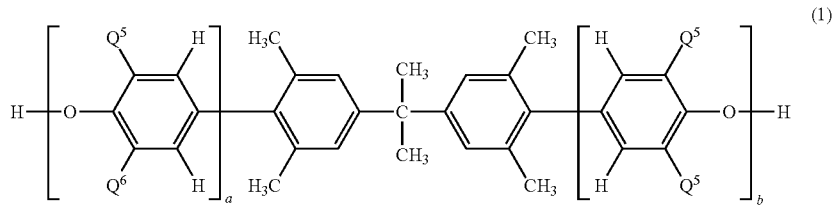

(1)

wherein each occurrence of Q5 and Q6 is independently methyl or di-n-butylaminomethyl; and each occurrence of a and b is independently 0 to about 20, provided that the sum of a and b is at least 2 (e.g., 2, 3, 4, or more). Bifunctional poly(arylene ether)s having this structure can be synthesized by oxidative copolymerization of 2,6-xylenol and 2,2-bis(3,5-dimethyl-4-hydroxyphenyl)propane in the presence of a catalyst comprising di-n-butylamine.

Polyphenylene Sulfide (PPS) Resins

Generally, polyphenylene sulfide (PPS) is known in the art as a high-performance thermoplastic. PPS can be molded, extruded, or machined to tight tolerances, and has a relatively high maximum service temperatures of about 218° C. At 1 MHz, PPS resins (depending on particular composition) typically have a dielectric constant (Dk) of 4.0-4.5 and a dissipation factor (Df) of 0.0011-0.0084 at room temperature.

The poly(arylene sulfide) may be a homopolymer or a copolymer. For instance, selective combination of dihaloaromatic compounds can result in a poly(arylene sulfide) copolymer containing not less than two different units. The poly(arylene sulfide) may be linear, branched or a combination of linear and branched, and may be functionalized or unfunctionalized. Regardless of the particular structure, the weight average molecular weight of the poly (arylene sulfide) can be greater than or equal to 10,000 grams per mole (g/mol) (e.g., greater than 15,000 g/mol, greater than 20,000 g/mol, or more).

Various grades of PPS are commercially available and may be used in the present core-shell particles and methods; for example, linear poly(arylene sulfide) is commercially available from Celanese Corporation as Fortron® PPS and from Solvay as Ryton® PPS. The PPS used in the below-described examples was a grade FORTRON* 0214 coarse PPS powder available from Celanese Corporation (*Trademark of Celanese Corporation). Generally, the present methods and core-shell particles utilize PPS with a molecular weight (Mw) in excess of 10,000.

Polyaryl Ether Ketone (PAEK)

PAEK is a semi-crystalline thermoplastic that is recognized in the art as having excellent mechanical and chemical resistance properties that are retained to high temperatures. The processing conditions used to mold PEEK can influence the crystallinity and hence the mechanical properties. PEEK is commercially available from Victrex Ltd. as VICTREX PEEK.

Examples of polyaryletherketones (PAEKs) that are usable in at least some of the present configurations/implementations can include polyetheretherketone (PEEK), polyetherketone (PEK), polyetherketoneketone (PEKK), polyetheretherketoneketone (PEEKK), and polyetherketoneetherketoneketone (PEKEKK). Suitable compounds from these groups are known in the art. Particular commercial examples include PEEK and PEK polymer types (available from Victrex plc.), especially PEEK 450P™, PEEK 150P™, and PEK P22™ In particular, the PEEK used in the below-described examples was a grade PEEK 150G™. At 1 MHz, PAEK resins (depending on particular composition) typically have a dielectric constant (Dk) of 2.5-3.3 and a dissipation factor (Df) of 0.001-0.005 at room temperature.

Polypropylene (PP)

Polypropylene (PP) is a semi-crystalline and non-polar polymer, and exhibits properties similar to, but slightly harder and more heat resistant than, polyethylene. PP also exhibits good mechanical and chemical resistance properties. At 1 MHz, PP has a dielectric constant (Dk) of 2.2 and a dissipation factor (Df) of 0.0003 at room temperature.

Fluoropolymers

Polytetrafluoroethylene (PTFE) is a synthetic fluoropolymer of tetrafluoroethylene that has numerous applications, particularly where low friction and non-reactivity are desired. At 1 MHz, PTFE has a dielectric constant (Dk) of 2.1 and a dissipation factor (Df) of 0.0002 at room temperature.

Perfluoroalkoxy alkane (PFA) is a copolymer of tetrafluoroethylene and perfluoroethers. PFA can exhibit better anti-stick properties and chemical resistance than PTFE, but is typically easier to form (e.g., via melt processing). At 1 MHz, PTFE has a dielectric constant (Dk) of 2.1 and a dissipation factor (Df) of 0.0001 at room temperature.

Fluorinated ethylene propylene (FEP) is a copolymer of hexafluoropropylene and tetrafluoroethylene. FEP shares some similarities with PTFE (e.g., low friction and non-reactivity), but is typically easier to form. At 1 MHz, FEP has a dielectric constant (Dk) of 2.1 and a dissipation factor (Df) of 0.0007 at room temperature.

Ethylene tetrafluoroethylene (ETFE) shares some similarities with PTFE (e.g., low friction and non-reactivity), but was developed to have a higher strength over a wide temperature range. At 1 MHz, ETFE has a dielectric constant (Dk) of 2.5 and a dissipation factor (Df) of 0.006 at room temperature.

Polyvinylidene fluoride (PVDF) is a highly non-reactive thermoplastic fluoropolymer produced by the polymerization of vinylidene difluoride. PVDF is relatively easy to process and has a lower density than PTFE. At 1 MHz, PVDF has a dielectric constant (Dk) of 8.5 and a dissipation factor (Df) of 0.05 at room temperature.

Ethylene chlorotrifluoroethylene (ECTFE) is a copolymer of ethylene and chlorotrifluoroethylene, and was developed to provide chemical resistance in highly corrosive environments. At 1 MHz, ECTFE has a dielectric constant (Dk) of 2.5 and a dissipation factor (Df) of 0.15 at room temperature.

Methods of Making Powders of Polymer-Ceramic Core-Shell Particles

Figure 3A:
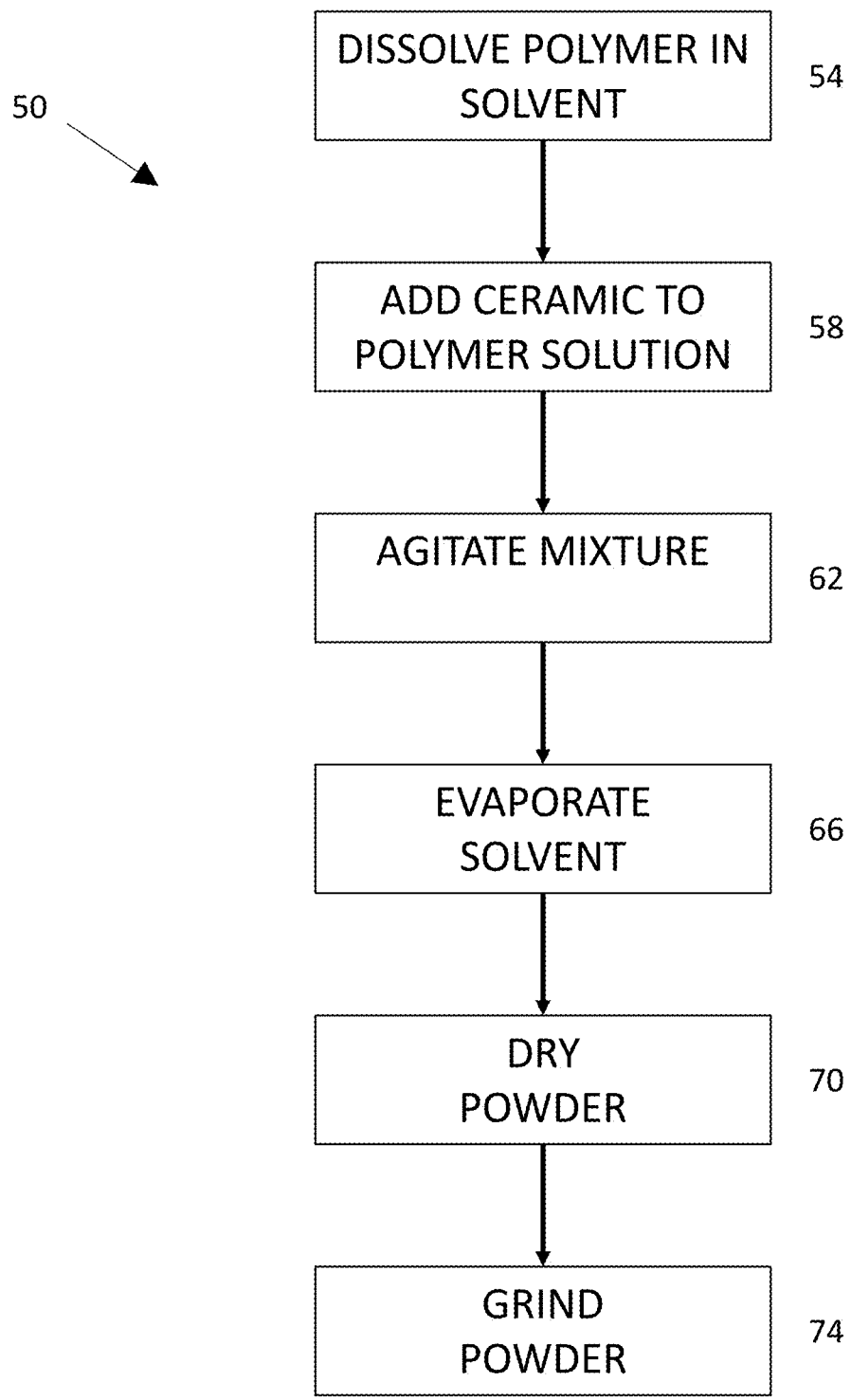
FIG. 3A is a flowchart of a first example of a method of making a powder of the present core-shell particles.

FIG. 3A depicts a flowchart 50 of a first example of a method of making a powder of the present core-shell particles (e.g., 10).

First mixing the ceramic particles with the solvent can have certain benefits, for example, in reducing the agglomerating of ceramic particles. This benefit can be realized whether beginning with ceramic particles that are not agglomerated in their powder form, or with ceramic particles that are agglomerated in their powder form.

At a step 54, polymer (PEI, PEI copolymers, PPE, PPS, PAEK, PTFE, PFA, FEP, ETFE, PVDF, or ECTFE) is mixed with a solvent, and particles of the ceramic (BaTiO$_3$, SrTiO$_3$, TiO$_2$, CaTiO$_3$, and/or MgTiO$_3$) are mixed together. The ceramic particles are added in an amount needed to result in a desired ratio of ceramic to polymer for the finished core-shell particles. For example, in some configurations of such powders, the core-shell particles comprise between 50% and 90% by volume of the ceramic (e.g., 50% to 70% by volume of the ceramic).

The polymer, solvent, and ceramic may be mixed at the same time in a single vessel, or may be mixed sequentially. For example, the polymer particles may first be mixed into a solvent (e.g., in a first vessel, such as a homogenizer) in conditions under which the polymer will partially or fully dissolve in the solvent, and the ceramic may subsequently be mixed into the solvent-polymer mixture (e.g., in the first vessel or in a second vessel). The PEI examples described below utilized dichloromethane (DCM). Other solvents that may be utilized in the present methods include those in which the polymer is Freely Soluble or Soluble at elevated temperatures (e.g., above 75° C., above 100° C., about 150° C., and/or above 200° C.), and Slightly Soluble or Sparingly Soluble at lower temperatures (e.g., below 50° C., such as at ambient temperatures), examples of which include: N-Methyl-2-pyrrolidone (NMP), sulfolane, DMSO (dimethyl sulfoxide), DMF (dimethylformamide), DMAC (Dimethylacetamide), ODCB (orthodichlorobenzene), chlorobenzene, 4-Chloro Phenol, and NEP (N-ethyl pyrrolidone). As used herein, Freely Soluble requires 1 to 10 ml of solvent to dissolve 1 gram (g) of the polymer, Soluble requires 10 to 30 ml of solvent to dissolve 1 gram (g) of the polymer; Slightly Soluble requires 100 to 1000 ml of solvent to dissolve 1 gram (g) of the polymer; Sparingly Soluble requires 1000 to 10000 ml of solvent to dissolve 1 gram (g) of the polymer.

At a step 58, the mixture is agitated (e.g., via an impeller) for a period of minutes (e.g., equal to or greater than 1 minute, 5 minutes, 10 minutes, 20 minutes, 30 minutes, 40 minutes, 50 minutes, 60 minutes, or more) sufficient to substantially homogenize the mixture.

At a step 62, which may be partially or entirely simultaneous with step 58, the solvent is then evaporated from the mixture. For example, the mixture can be placed in vessel that leaves a relatively large surface area of the mixture exposed to air to facilitate evaporation, and/or evaporation can be facilitated or accelerated via a rotary evaporator and/or spray drying.

At an optional step 66, which may be partially or entirely simultaneous with step 62, the remaining powder is dried at an elevated temperature (e.g., at or above the boiling temperature of the solvent) and/or under reduced pressure period of time (e.g., 2 hours, 4 hours, 6 hours, 8 hours, 10 hours, 12 hours, or more) to accelerate evaporation of the solvent and corresponding drying of the powder. For example, when using DCM as the solvent, the remaining polymer and ceramic can be dried at 120° C. for a period of at least 2 hours.

In some implementations, agitation or stirring of the mixture continues for at least part of the evaporation/drying process, for example, to maintain homogeneity during some or all of the evaporation.

Finally, at an optional step 70, the dried powder is subjected to grinding or milling to reduce and homogenize the average particle size of the powder. For example, the dried powder can be ground using a centrifugal mill (e.g., a ZM 200 Ultra Centrifugal Mill available from Retsch GmbH).

Figure 3B:
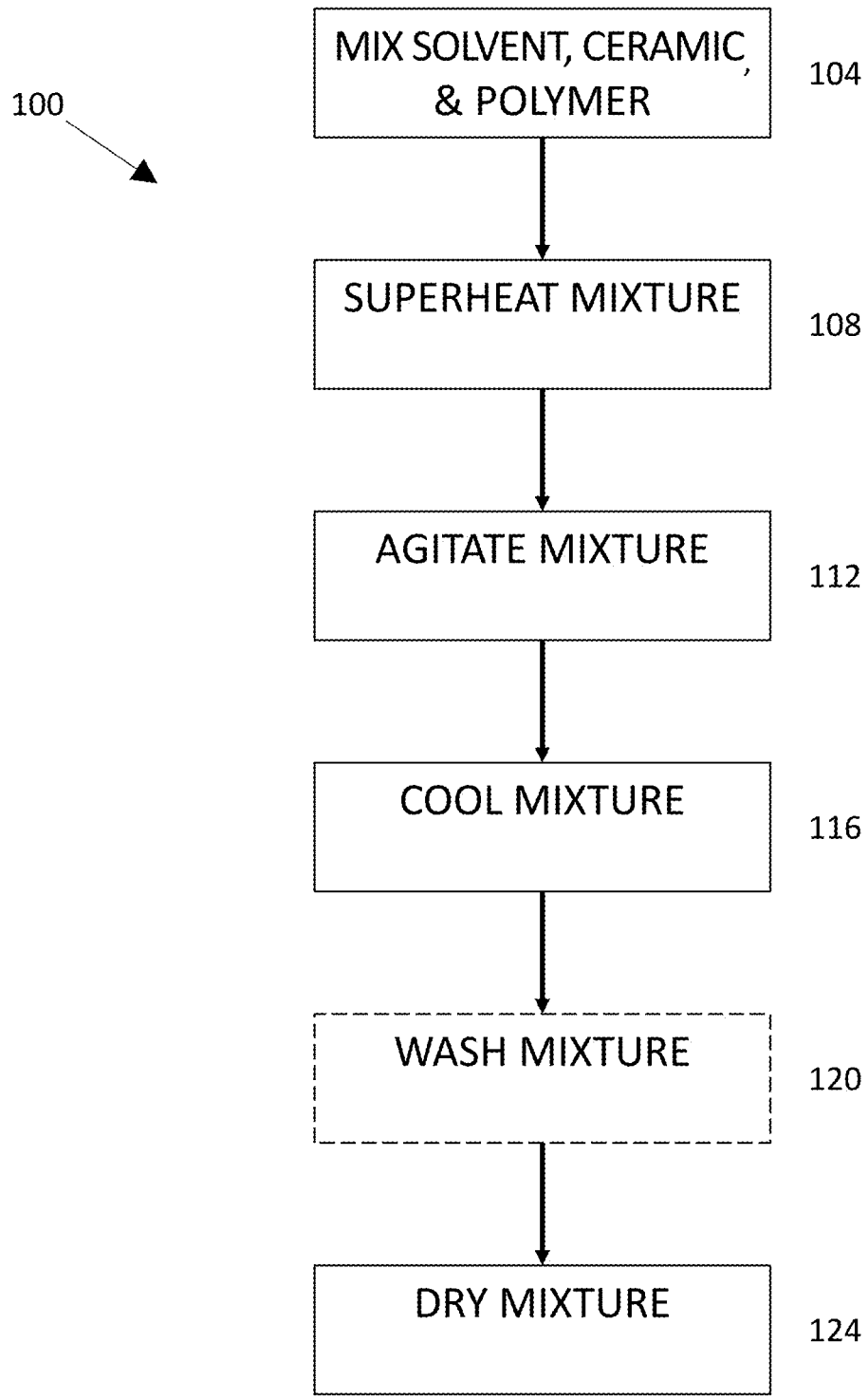
FIG. 3B is a flowchart of a second example of a method of making a powder of the present core-shell particles.
Figure 4:
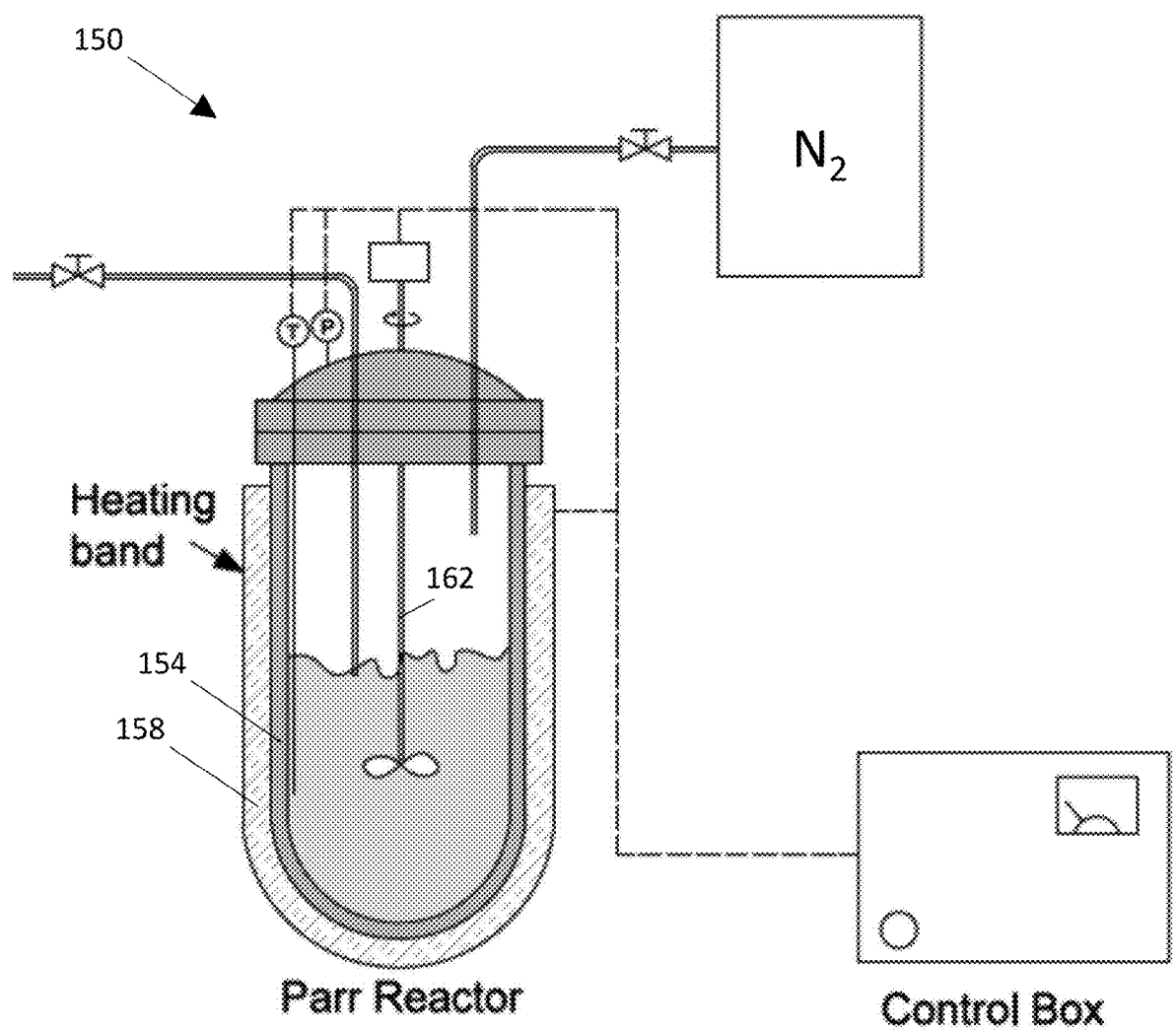
FIG. 4 is a schematic illustration of stirring reactor of a type that can be used to make a powder of the present core-shell particles.

Referring now to FIGS. 3B and 4, FIG. 3B depicts a flowchart 100 of a second example of a method of making a powder of the present core-shell particles (e.g. 10), and FIG. 4 depicts a schematic illustration of stirring reactor 150 of a type (e.g., a PARR® reactor) that can be used to make a powder of the present core-shell particles.

First mixing the ceramic particles with the solvent can have certain benefits, for example, in reducing the agglomerating of ceramic particles. This benefit can be realized whether beginning with ceramic particles that are not agglomerated in their powder form, or with ceramic particles that are agglomerated in their powder form.

At a step 104, polymer (PEI, PEI copolymers, PPE, PPS, PAEK, PTFE, PFA, FEP, ETFE, PVDF, or ECTFE), solvent, and particles of the ceramic (BaTiO$_3$, SrTiO$_3$, TiO$_2$, CaTiO$_3$, and/or MgTiO$_3$) are mixed together. The polymer, solvent, and ceramic may be mixed at the same time in a single vessel, or may be mixed sequentially. For example, the ceramic particles may first be mixed into a solvent (e.g., in a first vessel, such as a homogenizer), and the polymer may subsequently be mixed into the solvent-ceramic mixture (e.g., in the first vessel or in a second vessel, such as a shell or container 154 of stirring reactor 150). The solvent may comprise any solvent in which the polymer will dissolve under superheated conditions, as described below. Other solvents that may be utilized in the present methods include those in which the polymer is Freely Soluble or Soluble at elevated temperatures (e.g., above 75° C., above 100° C., about 150° C., and/or above 200° C.), and Slightly Soluble or Sparingly Soluble at lower temperatures (e.g., below 50° C., such as at ambient temperatures), examples of which include: N-Methyl-2-pyrrolidone (NMP), sulfolane, DMSO (dimethyl sulfoxide), DMF (dimethylformamide), DMAC (Dimethylacetamide), ODCB (orthodichlorobenzene), chlorobenzene, 4-Chloro Phenol, and NEP (N-ethyl pyrrolidone).

At a step 108, the mixture of polymer, ceramic, and solvent is superheated (e.g., via a heating element 158 of reactor 150) to at least partially (e.g., fully) dissolve the polymer in the solvent. In particular, the mixture is heated to a first temperature that exceeds the normal boiling point of the solvent (and exceeds the glass transition temperature of an amorphous polymer, e.g., by 40° C. or more, or exceeds the melting temperature of a crystalline or semi-crystalline polymer, e.g., by 10° C., 40° C., or more), under a first pressure at which the solvent remains liquid. For example, when using NMP as the solvent, the mixture can be heated to 270° C. under a pressure of up to 180 pounds per square inch (psi) (e.g., 75 psi). When using other solvents, the pressure may be kept at a different level (e.g., 100 psi).

At a step 112, which may be partially or entirely simultaneous with step 108, the mixture is agitated (e.g., via impeller 162 of reactor 150) for a period of minutes (e.g., equal to or greater than 1 minute, 5 minutes, 10 minutes, 20 minutes, 30 minutes, 40 minutes, 50 minutes, 60 minutes, or more) while the temperature of the mixture is substantially maintained at or above the first temperature, and the pressure to which the mixture is subjected is substantially maintained at or above the first pressure. In particular, the temperature and pressure are maintained during agitation to keep the mixture in a superheated state.

At a step 116, the mixture is cooled to or below a second temperature that is below the boiling point of the solvent to cause the polymer to precipitate on the particles of the ceramic and thereby form a plurality of the present core-shell particles (e.g., 10). For example, when using NMP as the solvent, the mixture may be cooled to less than 120° C., less than 110° C., and/or to 100° C. Optionally, the mixture may continue to be agitated during this cooling step to resist agglomeration of the core-shell particles.

At an optional step 120, the formed core-shell particles may be washed or rinsed, either with the same solvent added in step 104 (e.g., NMP) or with a different solvent (e.g, Methanol or MeOH). For example, the wet solids cake can be removed from the vessel (e.g., shell or container 154 of reactor 150) and placed in a filter for rinsing.

At a step 124, the solids cake is dried to form a dry powder of the core-shell particles (e.g., 10), for example, at a temperature above the boiling point of the solvent added in step 104 and/or of the solvent used to wash/rinse the solids cake at optional step 120, optionally at a second pressure below ambient pressure (i.e., under vacuum). By way of example, when NMP (normal boiling point of ~202° C.) is added at step 104 and MeOH (normal boiling point of ~65° C.) is used in step 120, the solids cake can be dried under vacuum at a temperature of 200° C. for a period of time (e.g., 4 hours, 6, hours, 8 hours, 10 hours, 12 hours, or more). When using other solvents, the pressure may be kept at a different level (e.g., 100 psi). At atmospheric pressure (1 bar), drying can be carried out above the normal boiling point. Alternatively, drying can be carried out at reduced pressures, and temperatures that are lower than the normal boiling point but above the lowered boiling point corresponding to the reduced pressure.

Molding Parts from Polymer-Ceramic Core-Shell Particle Powders

Figure 5:
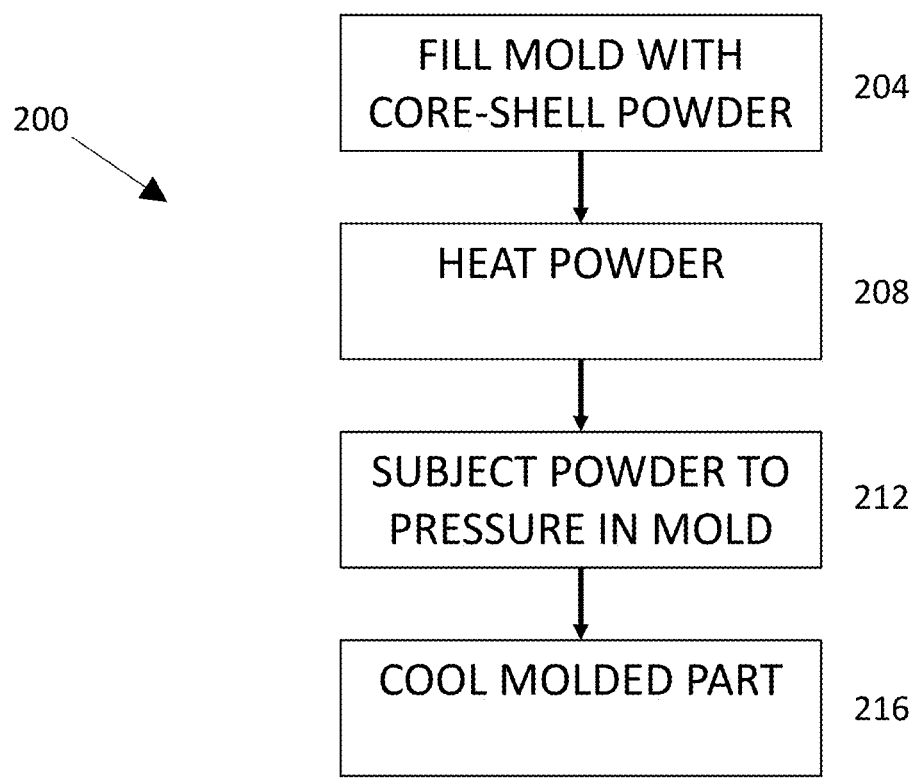
FIG. 5 is a flowchart of one example of a method of molding a part from a powder of the present core-shell particles.
Figure 6:
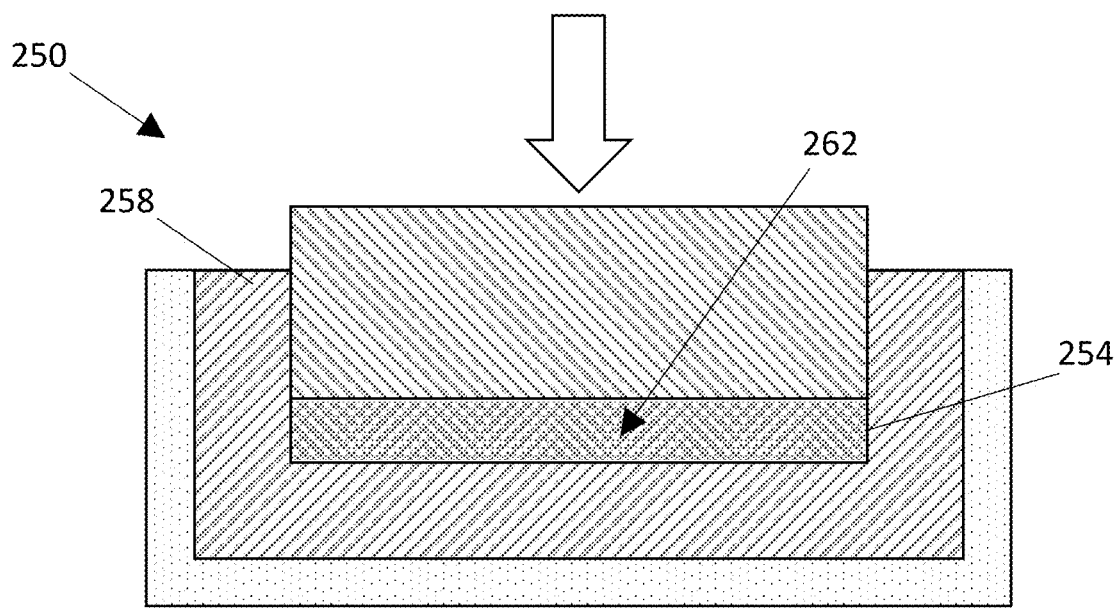
FIG. 6 is a schematic illustration of a compression mold for molding a part.

Referring now to FIGS. 5 and 6, FIG. 5 depicts a flowchart 200 of one example of a method of molding a part from a powder of the present core-shell particles, and FIG. 6 depicts a schematic illustration 250 of a compression mold for molding a part.

At a step 204, a working portion of a cavity 254 of a mold 258 is filled with a powder 262 of the present core-shell particles (e.g., 10).

At a step 208, the powder (262) is heated to at or above a first temperature (e.g., via a heating jacket 266) that exceeds (e.g., by at least 10° C., at least 20° C., at least 30° C., or more) a melting temperature ($T_m$) of the polymer. For example, when the $T_m$ of a particular polymer is ~275° C., the first temperature can be 285° C. or 315° C. or more.

At a step 212, which may be partially or entirely simultaneous with step 208, the powder is subjected to a first pressure (e.g., 350 Megapascals (MPa)) in the mold while the powder (e.g, and the mold) is held at or above the first temperature. The pressure may be maintained for a period of minutes (e.g., equal to or greater than 5 minutes, 10 minutes, 20 minutes, 30 minutes, 40 minutes, 50 minutes, 60 minutes, or more). In some implementations, the conditions (temperature, pressure, and/the like) and period of time for which the conditions are maintained are sufficient to result in a molded part with a relative density of greater than 90%.

EXAMPLES

1. Example 1: Powder of PEI-TiO$_2$ Core-Shell Particles

Materials: 80.7 grams (g) Titanium Dioxide (TiO$_2$), 19.3 g PEI, 300 g dichloromethane (DCM). The PEI used was ULTEM® 1000 available from SABIC innovative Plastics. The Titanium Dioxide was C.I. Pigment White 6 (CAS #13463-67-7) powder. Relative amounts of TiO$_2$ and PEI resulted in TiO$_2$ being about 60% by volume of the formed core-shell particles.

The DCM solvent was placed in a 1000 mL beaker and the PEI dissolved into the DCM to form a PEI solution. The TiO$_2$ was then added to the PEI solution and homogenized using an T 25 digital ULTRA-TURRAX® dispersing instrument (available from IKA Works, Inc. (Wilmington, NC USA)) at 12,000 RPM for 3 minutes to form a heterogeneous slurry. The slurry was then poured into a larger vessel to expose a greater surface area to air and thereby allow the solvent to evaporate. The powder was then placed under vacuum at 120° C. for two hours to dry the powder, and the dried powder subjected to grinding in a ZM 200 Ultra Centrifugal Mill available from Retsch GmbH, and the ground powder collected for use.

2. Example 2: Compression Molded Pellet of PEI-TiO$_2$ Core-Shell Particles

Materials: 14 g of a dry powder of PEI-TiO$_2$ core-shell particles as produced in Example 1 described above.

Figure 7A:
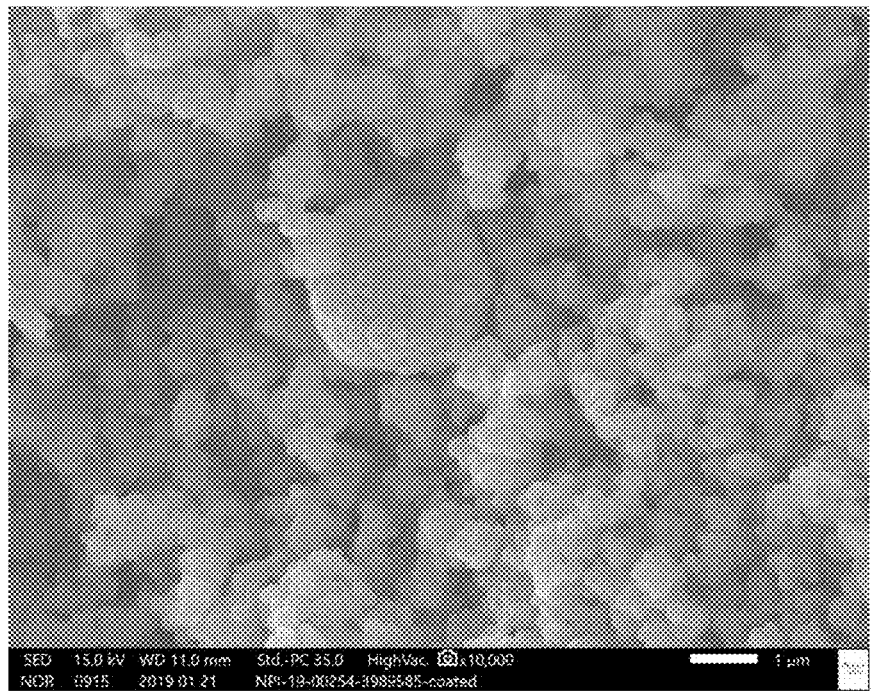
FIGS. 7A and 7B respectively are scanning electron microscope (SEM) images of uncoated $TiO_2$ particles and a compression-molded composite part made from a powder of the PEI-$TiO_2$ core-shell particles.
Figure 7B:
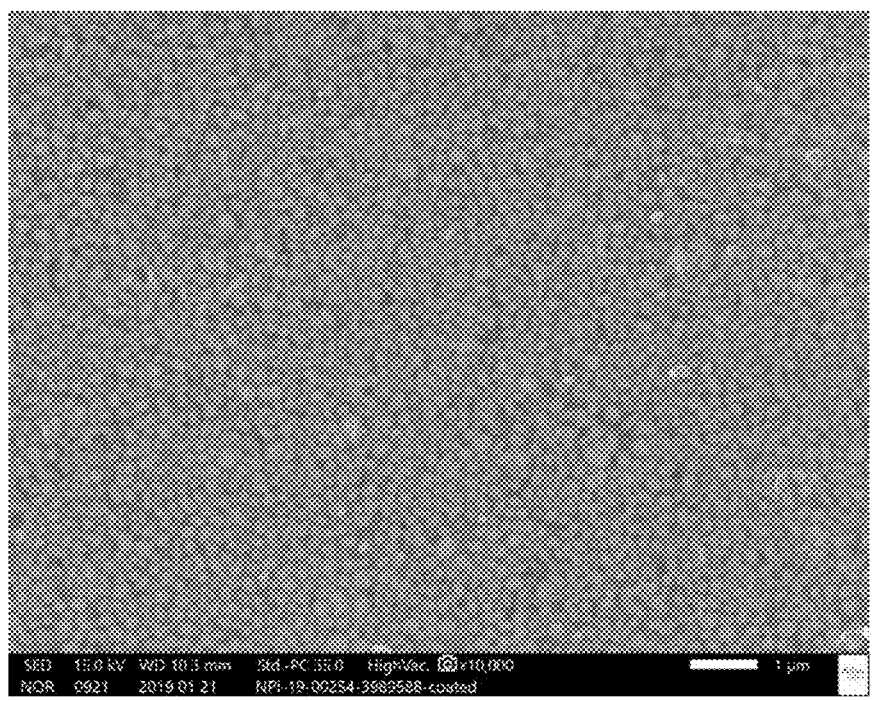

Procedure: The powder was measured into an aluminum pan. Using a paper funnel, the powder was then poured into a circular cylindrical die of 35 millimeter (mm) internal diameter. The powder was then lightly compacted in the die using a rod, and a heating jacket was mounted around the die. The die was then heated to a first temperature of 260° C., and maintained at the first temperature for five (5) minutes. A hydraulic press was then used to apply to the powder a pressure of 12 tons or 122 MPa to produce a pellet with a nominal thickness of 4.7 mm. The mold was then held at the first temperature, with the powder under pressure, for a period of sixty (60) minutes, after which the heater was turned off and the die allowed to cool while the pressure was maintained. After 60 minutes, the PEI-$TiO_2$ composite pellet was removed from the die, and the pellet weighed and its dimensions measured to calculate relative density. FIG. 7B depicts the microstructure of the compressed pellet, and certain characteristics of the pellets are included in Table 2 below.

3. Prophetic Example 3: Powder of PEI-$TiO_2$ Core-Shell Particles

60% by volume Titanium Dioxide ($TiO_2$), 40% by volume PEI, ODCB solvent (split into a larger portion of sufficient volume to dissolve the PEI and disperse the $TiO_2$ in the solution, and a smaller portion of a volume equal to about 20% of that of the larger portion). PEI to be ULTEM® 1000 available from SABIC Innovative Plastics. Titanium Dioxide to be C.I. Pigment White 6 (CAS #13463-67-7) powder. Relative amounts of $TiO_2$ and PEI to result in $TiO_2$ being about 60% by volume of the formed core-shell particles.

Procedure: $TiO_2$ to be homogenized in the larger portion of the ODCB in a 600 mL beaker using an IKA homogenizer (available from IKA Works, Inc. (Wilmington, NC USA)) for 5 minutes at 15,000 revolutions per minute (rpm). A small amount of the smaller portion of the ODCB to be used to rinse the homogenizer head to remove residual $TiO_2$ from the homogenizer head. The $TiO_2$ and ODCB mixture, and the PEI, to then be added to a 600 mL PARR™ reactor shell/container with agitator. Some of the remainder of the smaller portion of the ODCB to be used to rinse the beaker, with all of the ODCB then being added to the PARR™ reactor shell. The PARR™ reactor shell to then be attached to the PARR™ reactor unit and the reactor controller powered on. A line from a nitrogen ($N_2$) source to then be attached to the head-space port of the PARR™ reactor shell, and the headspace in the shell purged several times with $N_2$. During the purging process, the pressure in the reactor shell to be observed to ensure a tight seal. In particular, it was known that the $N_2$ in a sealed reactor shell would typically reach 80-95 psi. As such, once the $N_2$ is added to the headspace, the $N_2$ source to be turned off and all of valves on the PARR™ reactor to be closed. When the pressure remains substantially constant after about 45 seconds (s), the pressure to be released and the headspace purged with $N_2$ two or three total times. If instead the pressure decreases, the pressure to be released, the unit tightened again, and the process repeated until the pressure remains constant and the headspace can be thereafter purged the two or three total times. After the headspace is purged, the thermocouple to be inserted into the temperature port on the reactor shell, and the cooling water line for the agitator to be opened or turned on. The locking ring to then be added around the point at which the shell attaches to the rest of the PARR™ reactor unit and tightened as much as possible by hand. The heater to then be aligned with and secured around the reactor shell.

On the reactor controller, the primary temperature to then be set to 250° C., the high limit pressure set to 180 psi, and the high limit temperature set to 200° C. The heater to then be set to Setting II (highest heat setting) and the agitator/impeller turned on and set to ~250 rpm. Once the temperature reaches ~220° C., the heater to be turned down to Setting I to allow for the maintenance of a more consistent temperature at 250° C. (to avoid the temperature fluctuating higher or lower than 250° C.). Once the thermocouple indicates the mixture in the reactor shell has reached 250° C., the reactor to be held at that temperature for 30 minutes (min) while agitation continued. Reaction pressure at this temperature to be about 75 psi or less, but in other implementations could be managed to be as high as 100 psi. After 30 minutes, the heater to be turned off and the mixture allowed to cool to a temperature below 110° C. (time permitting, the mixture could be allowed to cool to 100° C.) to ensure that all PEI has precipitated. Once below 60° C., the pressure should be at about 5 psi. The pressure release valve to then be slowly turned to lower the pressure to ~0 psi. Once the pressure is relieved, the agitator to be turned off, the reactor controller to be turned off, and the cooling water line to be turned off. The heater to then be removed and the shell disengaged from the rest of the PARR' reactor unit. The mixture in the reactor shell to then be poured into a small beaker, and about an additional 100 milliliters (mL) of ODCB to be used to rinse residual material from the interior of the reactor shell for transfer to the beaker. The material in the beaker to then be poured into a Buchner funnel and filter flask setup with a Whatman GF/F glass microfibre filter paper. The filtered wet cake to then be rinsed with about 250 mL of ODCB, and placed into an aluminum pan to be dried under vacuum at 200° C. overnight. The powder formed by this superheating process is expected to exhibit similar characteristics to that of the powder formed by the evaporation process of Example 1, but is also expected to exhibit relatively better homogeneity and consistency of coating of the polymer on the ceramic. Likewise, molded pellets formed from the powder made by the superheating process of Prophetic Example 3 are expected to exhibit greater homogeneity and consistent distribution of ceramic and polymer, and corresponding improvement in Dk and Df, relative to the molded part of Example 2.

4. Experimental Results

As explained above for Example 1, a powder with core-shell particles were produced, and certain processing parameters and properties of the powders are summarized in Table 1. As explained above for Example 1, the superheat-cool powder-production process was carried out in a PARR® reactor with reaction pressures less than or equal to 75 psi.

TABLE 1

Powder Production via Evaporation Process-Process Parameters

| Example | Polymer | Filler | Solvent | PARR Agitation (rpm) | Drying Temp. C. | Drying Time, min | Mass Polymer (g) | Mass Ceramic (g) | Polymer/ceramic vol/vol |
|---|---|---|---|---|---|---|---|---|---|
| 1 | PEI | $TiO_2$ | DCM | 12000 | 120° C. | ≥120 | 19.3 | 80.7 | 40/60 |

Particle size values of the powders were measured with a Malvern Mastersizer 3000 commercial particle size analyzer (available from Malvern Panalytical Ltd. in Malvern, UK).

Morphology of the particles was also investigated using scanning electron microscopy. In particular, FIG. 7A shows uncoated $TiO_2$ particles; and FIG. 7B shows PEI-$TiO_2$ core-shell particles compression molded into a part. As shown in the SEM image of FIG. 7B, a thin layer of PEI is evident between the ceramic grains and the ceramic particles are substantially free of agglomeration.

Thermogravimetric analysis (TGA) properties for the core-shell powder of Example 1, describe above, are summarized in Table 2. The density of the powder is given as comparative reference. No apparent degradation in molecular weight of the polymer was observed as a result of the present superheating-cooling methods of making the present core-shell particles.

TABLE 2

Density, TGA, and Molecular Weight Data for Core-Shell Powders

| | | Composition | | | TGA | | | |
|---|---|---|---|---|---|---|---|---|
| Example | Sample Type | Filler | Polymer | Density (g/cm³) | Polymer (wt %) | Mw (Da) | Mn (Da) | PD |
| 1 | Powder | $TiO_2$ | PEI | 2.93 | 19.38 | 53969 | 21873 | 2.5 |

TGA results on a compression molded part made from the core-shell powders are summarized in Table 3. The density of the polymers parts molded at the same conditions as in Table 2 are given as comparative reference. No apparent degradation in molecular weight of the polymer was observed.

TABLE 3

Density, TGA, and Molecular Weight Data for Pellets of Core-Shell Powders

| | Composition | | Temp/Time/Pres | Density | Relative Density | TGA Polymer | Mw | Mn | |
|---|---|---|---|---|---|---|---|---|---|
| Example | Filler | Polymer | (° C.)/min/ton | (g/cm³) | (%) | (wt %) | (Da) | (Da) | PD |
| 2 | $TiO_2$ | PEI | 260/60/12 | 3.00 | 102.7 | 18.8 | 52796 | 21138 | 2.5 |

Relative Density was determined by measuring the density of the molded pellet (Measured Density ($\rho_M$)) and comparing that to the Theoretical Density. The Measured Density may be calculated by dividing the volume, determined by measuring the outer dimensions (the volume of other shapes can be determined by any of various known methods, for example by submersion in an incompressible fluid), by the weighing the pellet (determined with a scale or balance). For the present examples, the Measured Density of the samples (e.g., pellets) was determined by the Archimedes method, using a KERN ABS-N/ABJ-NM balance equipped with an ACS-A03 density determination set. In particular, each sample was dried and the dry weight ($W_{dry}$) measured. The sample was then subjected to boiling in water for a period of 1 h to ensure that all voids in the object were filled with the water. The sample when then suspended in the used liquid at a known (non-boiling) temperature to determine the apparent mass in liquid ($W_{sus}$). The sample was then removed from the water, and the excess water wiped from the surface of the sample using a tissue moistened with the water. The saturated sample was then immediately weighed in air ($W_{sat}$). The density was then determined using Formula (6):

$$\text{Density part} = \frac{Wdry}{Wsat - Wsus} * \text{density of water} \quad (6)$$

In the present examples, the quantities of polymer and ceramic in a pellet were known. When the starting proportions are not known, the organic content of the polymer in the compression-molded pellet can be determined by thermogravimetric analysis (TGA) in air, permitting the calculation of the content of ceramic in the compression-molded pellet. The combined density or Theoretical Density ($\rho_T$), assuming zero voids/gas content, was then calculated using Formula (7):

$$\rho_T = ((m_p \times \rho_p) + (m_c \times \rho_c))/(m_p + m_c) \quad (7)$$

where $m_p$ is the mass of the polymer in the molded pellet, $\rho_p$ is the density of the polymer, $m_c$ is the mass of the ceramic in the molded pellet, and $\rho_c$ is the density of the ceramic. Relative Density ($\rho_R$) is then calculated according to Formula (8):

$$\rho_R = \rho_M/\rho_T \times 100 \quad (8)$$

The measurement of weight changes, programmed as isothermal or linear heating temperature conditions, can be monitored in solid or liquid specimen by the use of a Thermogravimetric Analyzer (TGA). The measurement of weight change, normally weight loss, can result from the degradation (thermal or oxidative) of the specimen, of by the evolution of volatiles below the degradation temperature of the sample. For the TGA measurements discussed herein, less than 50 mg of sample was weighed in a platinum pan, and the TGA test was conducted using a Discovery TGA at heating rate of 20° C. per minute in air.

Dielectric properties (dielectric constant (Dk) and dissipation factor (Df)) for composite parts were measured using one of two techniques. At 1 GHz, a Keysight E4991B impedance analyzer coupled to a 16453A dielectric material test fixture was used. This method employs a standard parallel plate geometry and the IPC 2.5.5.9 test methodology was followed.

At frequencies above 1 GHz, the split-post dielectric resonator (SPDR) technique was used. This experimental setup used consisted of an SPDR fixture from QWED Company connected to an E5071C network analyzer from Agilent Technologies. The SPDR fixture is designed to resonate at a single frequency, which shifts based upon the Dk and thickness of the sample under test. All Dk and Df data are reported at a discrete frequency in the 1 to 10 GHz range. The composite parts were pre-conditioned at room temperature in 50% relative humidity for 24 hours prior to testing. All dielectric experiments were subsequently conducted at room temperature in 50% relative humidity. Sample thickness, a requirement for the determination of Dk and Df, was measured using a digital micrometer from Mitutoyo Corporation. Table 4 summarizes the measured properties at 1 GHz and 5 GHz.

Figure 8:
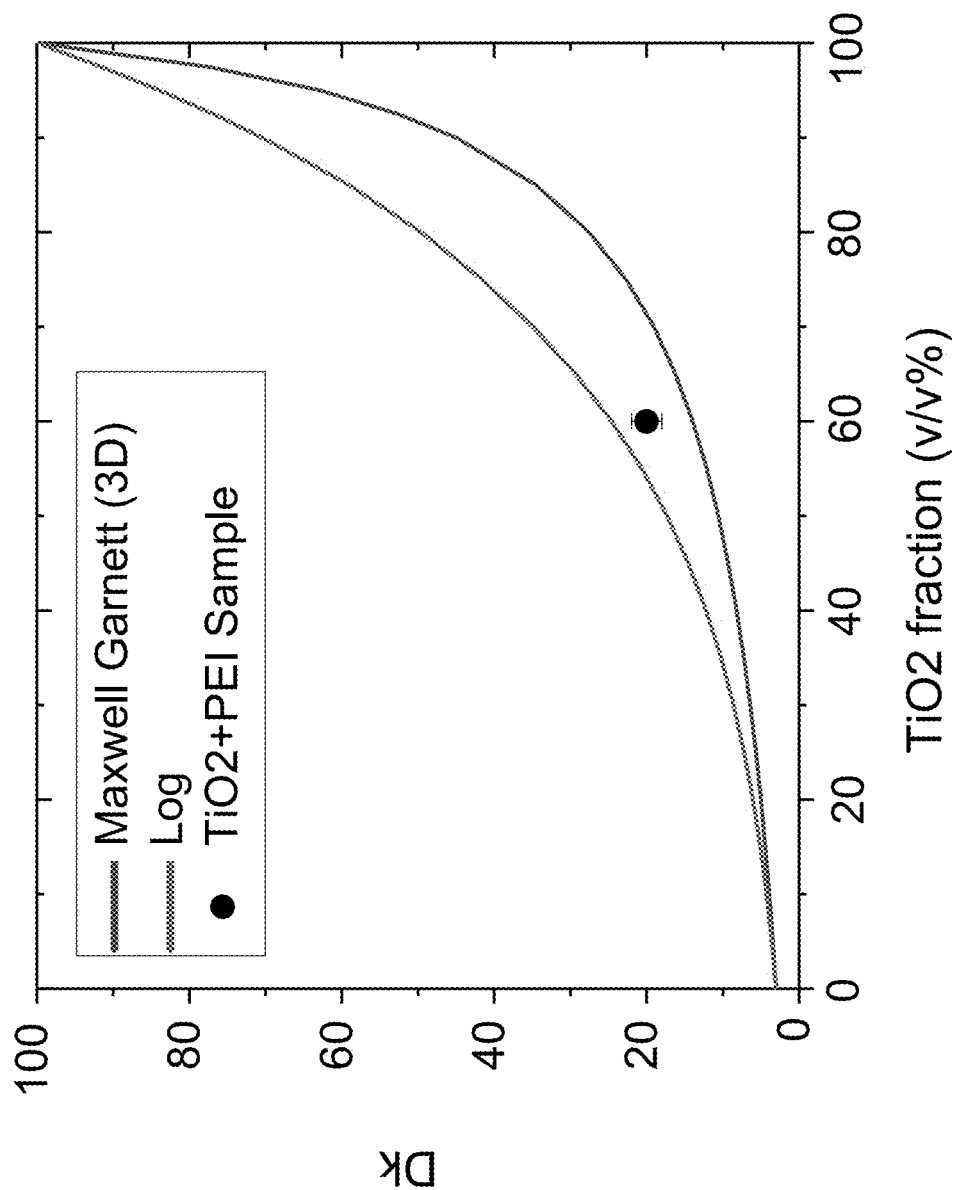
FIG. 8 shows the measured dielectric constant (Dk) at 5 GHz of a PEI-$TiO_2$ composite part relative to theoretical curves of predicted Dk relative to TiO2 volume fraction.

FIG. 8 depicts the measured dielectric constant (Dk) of the composite part relative to the Maxwell Garnett (3D) and Logarithmic mixture effective medium approximations for predicted Dk relative to TiO2 volume fraction for a PEI-TiO$_2$ composite.

TABLE 4

Dielectric Characterization of Compression Molded Part

| Example | Frequency (GHz) | Dielectric Properties | |
|---|---|---|---|
| | | Dk | Df |
| 2 | 1 | 20 ± 1 | 0.005 |
| | 5 | 20 ± 1 | 0.003 |

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this disclosure. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiments. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments. Accordingly, no single implementation described herein should be construed as limiting and implementations of the disclosure may be suitably combined without departing from the teachings of the disclosure.

The claims are not intended to include, and should not be interpreted to include, means plus- or step-plus-function limitations, unless such a limitation is explicitly recited in a given claim using the phrase(s) "means for" or "step for," respectively.

The invention claimed is:

1. A ceramic-polymer composite powder, the powder comprising:
   a plurality of core-shell particles, where:
      each of the core-shell particles comprises a core and a shell around the core;
      the core comprises a particle of a ceramic selected from the group consisting of:
         BaTiO3, SrTiO3, TiO2, CaTiO3, MgTiO3, and combinations of any two or more thereof; and
      the shell comprises a polymer selected from the group of polymers consisting of:
         polyetherimide (PEI), polyetherimide (PEI) copolymers, polyphenylene ether (PPE), polyphenylene sulfide (PPS), polyaryl ether ketone (PAEK), polypropylene (PP), polytetrafluoroethylene (PTFE), perfluoroalkoxy alkane (PF A), fluorinated ethylene propylene (FEP), ethylene tetrafluoroethylene (ETFE), polyvinylidene fluoride (PVDF), and ethylene chlorotrifluoroethylene (ECTFE);
   where the core-shell particles comprise between 50% and 90% by volume of ceramic, and between 10% and 50% by volume of the polymer;
   where the core-shell particles have a Dv50 of from 50 nanometers (nm) to 100 micrometers (µm); and
   where substantially all of the polymer is not cross-linked; and
   where the core-shell particles are in powder form.

2. The powder of claim 1, where the ceramic particles are substantially free of agglomeration.

3. The powder of claim 1, where the powder is formed without grinding.

4. The powder of claim 1, where the core-shell particles comprise between 50% and 70% by volume of the ceramic.

5. The powder of claim 1, where the core-shell particles have a polymer-solvent content of less than 3000 parts per million (ppm).

* * * * *